United States Patent [19]

Scholz et al.

[11] Patent Number: 5,326,644
[45] Date of Patent: Jul. 5, 1994

[54] REPULPABLE PRESSURE-SENSITIVE ADHESIVE COMPOSITIONS

[75] Inventors: William F. Scholz, Altadena; Robert H. Van Ham, Arcadia, both of Calif.

[73] Assignee: Avery Dennison Corporation, Pasadena, Calif.

[21] Appl. No.: 14,119

[22] Filed: Feb. 5, 1993

[51] Int. Cl.$^5$ .............. B32B 27/10; B32B 23/08; B32B 27/36

[52] U.S. Cl. .................. 428/514; 428/511; 428/520; 524/801; 524/804; 526/59; 526/209; 526/212; 526/213; 526/224; 526/225; 526/319; 526/320

[58] Field of Search ............. 428/514, 511; 526/320

[56] References Cited

U.S. PATENT DOCUMENTS

| | | | |
|---|---|---|---|
| 4,110,290 | 8/1978 | Mori | 428/520 |
| 4,923,919 | 5/1990 | Frazee | 524/460 |
| 5,059,479 | 10/1991 | Yuyama | 428/323 |
| 5,185,212 | 2/1993 | Spada | 428/483 |

Primary Examiner—Fred Zitomer
Attorney, Agent, or Firm—Christie, Parker & Hale

[57] ABSTRACT

A water-dispersible, inherently tacky pressure-sensitive adhesive comprising a tacky emulsion polymer formed of from about 80% to 90% by weight of monomers comprising a major portion of at least alkyl acrylate containing from 4 to about 8 carbon atoms in the alkyl group and from about 20% to 10% by weight hydroxyethyl methacrylate, said emulsion polymer formed in the presence of anionic and nonionic surfactants to provide a polymer having a glass transition temperature of $-15°$ to $-50°$ C. A sufficient amount of chain transfer agent is employed to provide an emulsion polymer which when coated on a repulpable paper substrate enables recovery of paper fibers substantially free of adhesive under conditions of TAPPI Useful 204, and is resistant to loss of adhesive properties on exposure to high humidity.

29 Claims, No Drawings

5,326,644

REPULPABLE PRESSURE-SENSITIVE ADHESIVE COMPOSITIONS

FIELD OF THE INVENTION

This invention relates to water or alkali dispersible emulsion pressure-sensitive adhesives that are compatible with alkaline phosphored postage stamp paper.

BACKGROUND OF THE INVENTION

For a label or tape constructions, a product which passes a Tappi Useful Method 204 (Tappi UM 204), a de-inking and repulping test incorporated herein by reference will be considered repulpable.

Most rubber-based and acrylic adhesive systems are not repulpable. During the repulping process (fiber shearing), the adhesives tend to agglomerate and form globules, commonly referred to in the trade as "stickies." Stickies adversely affect paper quality and have a negative impact on the process of recycling paper.

Several approaches can be taken to remove adhesive stickies. One has been to use water-dispersible adhesive microspheres prepared by processes described in U.S. Pat. No. 3,691,140 to Silver, U.S. Pat. No. 4,155,152 to Baker et al., U.S. Pat. Nos. 4,495,318 and 4,598,212 to Howard, and U.S. Pat. No. 4,810,763 to Mallya et al., each incorporated herein by reference, and applied at appropriately low coat weights. While the adhesives disperse in the paper fiber adequately during the repulping process, the adhesive is not removed from the paper fibers. Rather, the adhesive microspheres accumulate in the paper fibers, reducing paper quality and limit the number of times the paper fibers can be repulped or recycled.

Water-soluble adhesive systems which provide for complete adhesive removal from the fiber have been used commercially. Typically, commercial water-soluble products have suffered from (a) poor shelf life (the tape or label is sold in a sealed plastic bag); (b) poor humidity and/or heat-aged performance; and (c) a propensity to bleed into the paper facestock (which reduces peel performance). Each of these problems is related to the high water-sensitivity of the respective products. Such water-soluble adhesives and tapes are described, for instance, in U.S. Patent 3,441,430 to Peterson; U.S. Pat. No. 3,865,770 to Blake, U.S. Pat. No. 4,052,368 to Larson, U.S. Pat. No. 4,413,080 to Blake, and U.S. Pat. No. 4,569,960 also to Blake, each incorporated herein by reference.

A need has existed to provide adhesives for a general purpose label and tape construction which are repulpable and not sensitive to changes in relative humidity and where no special precautions are required for storage or use as an adhesive for a label or tape. We have developed repulpable pressure-sensitive adhesives which contain from about 10 to about 20 percent by weight of a mixture of carboxylic acids typically a mixture of acrylic and methacrylic acids. While functional as a repulpable pressure-sensitive adhesive for a variety of papers, they do not however function with alkaline phosphored paper, a paper of superior whiteness used for postage stamps sold in the United States and elsewhere.

The reason is attributed to the reaction of zinc orthosilicate used to identify the location of a stamp on an envelope, with carboxylic groups in the polymer which essentially deactivate the adhesive. This reaction is amplified on exposure to high humidity.

A repulpable pressure-sensitive adhesive which is compatible with alkaline phosphored papers is the subject matter of the instant invention.

SUMMARY OF THE INVENTION

According to the present invention, there is provided an adhesive system which comprises an inherently tacky water-dispersible pressure-sensitive adhesive formed by emulsion polymerization from of from about 55% to about 90% by weight alkyl acrylates, interpolymerized with from about 10% to about 20% of hydroxyethyl methacrylate ("HEMA" herein), the polymerization occurring at least in part in the presence of a chain transfer agent preferably n-dodecyl mercaptan and chain transfer agent being present in an amount sufficient to provide a repulpable pressure-sensitive adhesive. The repulpable pressure-sensitive adhesives have a glass transition temperature in the range of about $-15°$ to $-50°$ C. and are preferably formed in the presence of a mixture of nonionic and anionic surfactants. Useful repulpable pressure-sensitive adhesive polymers may be prepared by one stage of emulsion polymerization, sequential polymerization or by blending separately formed emulsion polymers. Sequential emulsion polymerization is preferred. However formed, the emulsion pressure-sensitive adhesives may be blended with other adhesive polymers to control adhesive bleed and staining of the paper bleed without loss of repulpable properties as set by Tappi UM 204. Sequential polymerization appears to provide the best balance of adhesive properties, dispersibility and humidity resistance.

Some portion of the preferred adhesive polymers used as a repulpable product is polymerized in the presence of from about 0.5% to about 1.5% by weight of the monomers of a chain transfer agent, preferably n-dodecyl mercaptan. There may be optionally added an internal cross-linker during polymerization or, after polymerization, an external cross-linker to enhance cohesive strength and reduce paper bleed.

There may also be added, to reduce paper and paper stain bleed, up to about 40% by weight of adhesives of other emulsion polymers which do not hinder the ability of the adhesive to pass Tappi UM 204. Tackifiers, including rosin esters and rosin acids may be used to modify adhesive performance.

The repulpable pressure-sensitive adhesive polymers of this invention contain about 55% to about 90% b weight of an alkyl acrylate containing from 4 to about 8 carbon atoms in the alkyl group, from 10 to 20% preferably about 15% by weight hydroxyethyl methacrylate, from 0% to about 20% by weight vinyl acetate, and from 0% to about 30% by weight methyl acrylate formed at least in part in the presence of 0.5% to 1.5% by weight of the monomers of n-dodecyl mercaptan. There may optimally be employed from about 0% to 5% of the weight of the monomers of aluminum acetate as the external cross-linker and/or an internal cross-linker.

The presently preferred repulpable pressure-sensitive adhesive composition are based on a sequentially polymerized polymer system containing about 55% by weight 2-ethylhexyl acrylate, about 25% by weight vinyl acetate, and about 5% by weight methyl acrylate, and about 15% by weight hydroxyethyl methacrylate.

If blended, the polymers may be blended with up to about 40% by weight of a copolymer containing about 56.8% 2-ethylhexyl acrylate, about 37.8% by weight butyl acrylate about 1.9% by weight acrylic acid, about 3.8% by weight methacrylic acid, and about 0.6% by weight with itaconic acid, tackified with about 10 parts by weight of a rosin ester. Alternatively, the acrylic and methacrylic acids can be replaced with hydroxyethyl methacrylate and itaconic acid replaced by acrylamide.

The adhesive is coated, typically to a coat weight of 20–25 g/m$^2$ and applied as a continuous coat on a label or tape backing or face stock preferably alkaline phosphored paper. Such a product has the property of being reemulsified or dispersed under the conditions of the UM 204.

While useful as a repulpable adhesive for a variety of repulpable paper applications, the adhesives are especially useful as repulpable adhesives for alkaline phosphored paper the preferred paper used in the manufacture of United States postal stamps and stamps of other nations.

DETAILED DESCRIPTION

The present invention relates to water-dispersible, inherently tacky, repulpable pressure-sensitive adhesive polymers for use with alkaline phosphored paper, namely, paper of superior whiteness treated with zinc orthosilicate for stamp identification.

The pressure-sensitive adhesives useful in the instant invention are prepared by batch (single stage) or sequential polymerization or by blending of batch polymers. Glass transition temperature as measured by DSC (Differential Scanning Colorimetry) of the final polymer or blend of polymers is in the range from about $-15°$ C. to $-50°$ C. Repulpability requires limiting molecular weight of some amount of the polymer. This may be accomplished by utilizing as the adhesive polymer or a component of a polymer blend, an adhesive polymer formed in the presence of a chain transfer agent, preferably r-dodecyl mercaptan, at a concentration providing a net polymer blend having a good balance of dispersibility, pressure-sensitive adhesive performance, humidity resistance and a resistance to bleed.

The emulsion formed pressure-sensitive adhesives of the instant invention contain, on a percent by weight basis, from about 55 to about 90% by weight total of one or more alkyl acrylates containing from 4 to about 8 carbon atoms in the alkyl group. Useful alkyl acrylates include n-butyl acrylate, 2-ethylhexyl acrylate, isooctyl acrylate, and the like, as well as mixtures thereof.

Other modifying monomers may be effectively employed so long as the glass transition temperature of the final adhesive remains in the range of from about $-15°$ C. to $-50°$ C. Representative modifying monomers include lower alkyl acrylate such as a methyl acrylate; vinyl esters, such as vinyl acetate, vinyl butyrate, vinyl propionate, vinyl isobutyrate, vinyl valerate, vinyl versitate, and the like; and diesters of an unsaturated dicarboxylic acid and mixtures thereof, such as di-2-ethylhexyl maleate, di-2-ethylhexyl fumarate, and dibutyl fumarate and the like.

When employed, vinyl acetate and methyl acrylate improve the hydrophilic characteristic of the polymers, with methyl acrylate further acting to improve cohesive strength. Vinyl acetate and methyl acrylate are independently employed in a concentration of from 0% to about 30% by weight.

The preferred acrylate monomers are a mixture of 2-ethylhexyl acrylate and methyl acrylate.

The essential component of the repulpable polymers is a hydroxyethyl methacrylate (HEMA) present in an amount of from about 10% to about 20% by weight of the monomers.

All or a portion of the emulsion pressure-sensitive adhesive polymers used in the instant invention are prepared in the presence of a chain transfer agent present in an amount of from about 0.5% to about 1.5% by weight of the monomers, preferably from about 0.75% to about 1.25% by weight of the monomers. The preferred chain transfer agent is n-dodecyl mercaptan or t-dodecyl mercaptan.

The presently preferred repulpable polymer contains about 55% by weight 2-ethylhexyl acrylate, about 25% by weight vinyl acetate and about 5% by weight methyl acrylate.

The repulpable emulsion pressure-sensitive adhesive polymers are prepared by providing an initial charge to a polymerization reactor of an aqueous solution containing a nonionic surfactant which is preferably an ethoxylated rosin acid emulsifier. There is added to the initial charge in the reactor a small amount of the monomers separately prepared in a preemulsion containing anionic surfactant, preferably a sulfated ethoxylated nonylphenol and a free radical initiator system. The presently preferred nonionic surfactants are AR-150 an ethoxylated rosin acid emulsifier and Alipal CO-430 manufactured and sold by Hercules. The presently preferred anionic surfactant is Alipal CO-436 manufactured by Rhone Poulenc. The amount of nonionic surfactant employed may be from about 4% to about 8% by weight of the initial reactor charge, with anionic surfactant concentration being from about 2.5% to about 5% by weight of the monomers in the preemulsion.

The reaction is redox initiated and the remaining preemulsified monomers are added incrementally i.e., intermittently or continuously over a period of time.

While, as previously indicated, the monomers can be added in one preemulsion charge, it i.e: preferred that the monomers be sequentially added. It is presently preferred that from about 30% to about 50% of the total monomers be incrementally added to the initial charge and essentially totally reacted following by the incremental addition of the remainder of the monomers in a second preemulsion for reaction in the reactor. Excellent results have been obtained in sequential polymerization where each charge of monomers contains the same amount of hydroxyethyl methacrylate with the net repulpable product containing about 10% to about 20% by weight polymerized hydroxyethyl methacrylate.

We have found in general that the amount of chain transfer agent employed provides a trade-off between dispersibility, adhesive performance and humidity resistance, with the amount of chain transfer agent employed being inversely proportional to the amount of acid in the charge. It is believed the presence of high levels of hydroxyethyl methacrylate in the polymer, i.e., about 15% by weight enhances water-dispersibility, and therefore the polymer can have a higher molecular weight. This allows a reduction in the amount of chain transfer agent employed. At lower hydroxyethyl methacrylate concentrations, the polymer is less dispersible, and therefore more chain transfer agent is required to reduce molecular weight. As molecular weight is reduced, the tendency of the polymer to bleed into a paper facestock or baking is increased. This enhances, for some applications, the desirability of adding to the monomers an internal cross-linker such as diallyl maleate or an external cross-linker such as aluminum acetate. With the external cross-linker, cross-linking occurs after polymerization. Cross-linkers may be used in a concentration of 0% to about 1% by weight of the monomers.

Bleed can also be controlled by adding modifying acrylate polymers. The presently preferred additive polymers are externally prepared emulsion polymers. They are employed in a concentration of 0% to about 40% by weight of the total polymers. One such polymer is a copolymer of 2-ethylhexyl acrylate and butyl acrylate, containing about 2% by weight acrylic acid and about 3% by weight methacrylic acid with about 0.6% by weight itaconic acid formed by emulsion polymerization ("Polymer A" herein). Another is a polymer where the acrylic and methacrylic acids are replaced by HEMA and itaconic acid is replaced by acrylamide ("Polymer B" herein).

The adhesive may also be tackified with rosin ester tackifiers, rosin acid tackifiers and the like.

Water-dispersible pressure-sensitive adhesive polymers prepared by emulsion polymerization are described in detail herein. To be satisfactory, at least one polymer component of a composition must pass a wash-off screening test. In this test, the adhesive is coated onto a 2 mil polyester film at a coat weight of 20-25 g/m$^2$, dried in an oven at 70° C. for 15 minutes, cooled to room temperature, and then held under a water tap to determine if the adhesive turns milky. If so, then the adhesive has the ability to be dispersed or reemulsified or washed from a surface. This may also be established by placing a sample in a beaker of water and allowing the sample to stand to determine if the water in the beaker turns milky. A third screening test is to simply place drops of water on the adhesive surface and rub the water into the surface. If the water turns milky the adhesive is probably dispersible.

The repulpable pressure-sensitive adhesives of the instant invention are ecologically friendly and are adaptive for use with a variety of paper backing or stock especially alkaline phosphored paper stock used in the postal industry for postage stamps. Such papers are not compatible with adhesives of high acid content causing them to loose adhesion with time.

When the adhesives are combined with a paper face stock or backing used for postal stamps the adhesive will be applied over a water soluble layer which allows separation of the stamp face stock from the adhesive and provided on the opposed surface with means to enable identification of the location of a stamp on a properly stamped envelope to enable an automatic cancellation machine to determine if the envelope can be automatically cancelled or reject it for hand cancellation.

The preferred means of identification of a stamp is a zinc orthosilicate (Taggant) contained in the paper or applied as coating thereto. The under surface of the face stock is coated with a water soluble layer which allows through soaking for a period of no more than 30 minutes separation of the stamp face from the adhesive for stamp collector purposes. The next layer in the construction is the pressure-sensitive adhesive of the instant invention applied as an acrylic emulsion.

The pressure-sensitive adhesive layer is in contact with a release surface provided by a release liner or the opposed surface of the paper face stock. If provided by the opposed surface of the face stock, the release used must accept cancellation inks. While designed for use with alkaline phosphored paper the adhesives of this invention may be used as a repulpable adhesive for any paper stock whether alkaline or acid in nature The following Examples and Controls are to illustrate the invention. In respect to Table I, "EX" means an Example representative of the invention; "CONT" means Control. A requirement is that a composition at least rate "poor" in the cold water screening test. The requirement for ultimate repulpability means passing TAPPI hot water dispersibility test as based on UM 204. In respect to Table I "EHA" means 2-ethylhexyl acrylate, "VAC" means vinyl acetate, "MA" means methyl acrylate, "HEMA" means hydroxyethyl methacrylate, "VP" means vinyl pyrrolidone, "DD" means n-dodecyl mercaptan. "RH" means relative humidity. "Good Grab" means the presence of tacky properties. "No Grab" means loss of tacky properties.

Examples 1-7 and Controls 1-2 are for compositions involving sequential polymerization where monomers in the weight percent shown in a ratio of 2 to 3 at the composition shown in Table IV.

The polymerization procedure involved sequential addition of monomers preemulsions.

For the preferred polymer there was added to a reaction vessel the components shown in Table I.

TABLE I

| Component | Grams |
| --- | --- |
| WATER | 150 |
| AR-150 | 40 |
| Fe EDTA[1] | 0.05 |
| K$_2$S$_2$O$_8$ | 3.0 |

[1]Fe EDTA - Ferric salt of ethylenediaminetetraacetic acid.

The mixture was heated to 70° C. and treated with hydrogen peroxide for one half hour, then allowed to cool to 50° C. at which time there was added 3 grams K$_2$S$_2$O$_8$ grams of water.

There was separately formed, a preemulsion of the composition typically shown in Table II.

TABLE II

| Ingredient | Grams |
| --- | --- |
| Water | 190 |
| Alipal CO-436 (60%) | 24 |
| CO-430 | 1.4 |
| K$_2$S$_2$O$_8$ | 0.4 |
| NaHCO$_3$ | 1.6 |
| 2EHA | 220 |
| VAC | 120 |
| HEMA | 60 |
| Catalyst, tertiarybutylhydroperoxide(t-BHP) | 1.2 |

There are also formed a second preemulsion typically of the composition shown in Table III.

TABLE III

| Ingredient | Grams |
| --- | --- |
| Water | 225 |
| Alipal CO-436 (60%) | 36 |
| CO-430 | 2.16 |
| K$_2$S$_2$O$_8$ | 0.6 |
| NaHCO$_3$ | 1.8 |
| 2EHA | 330 |
| VAC | 120 |
| MA | 60 |
| HEMA | 90 |
| t-BHP | 1.8 |

TABLE III-continued

| Ingredient | Grams |
|---|---|
| n-DDM | 3.5 |

50 grams of the first preemulsion was charged to the reactor at 50° C. and the balance incrementally added over a two hour period. Following completion of addition of the first preemulsion there was started the incremental addition of the second preemulsion over a one hour period. The properties of the polymer formed are shown in Example 10 of Table IV.

The results shown in Table IV establish in respect of the controls that vinyl pyrrolidone cannot be substituted for the hydroxyethyl methacrylate and the use of a chain transfer agent was necessary to achieve repulpability. The compositions forming the preferred polymer is that of Example 7.

In terms of overall development of polymers described herein, the first polymer developed was that of Examples 1 and 2. While useful as a pressure-sensitive adhesive, they displayed an instability to gel after about three months. The polymers of Example 4 was made to improve shear characteristics and to stabilize viscosity, but this product also displayed an ability to gel. The polymer of Example 6 did not gel, but the viscosity drift was too high with viscosity varying with time from 750 cp through 4500 cp. By reducing methyl acrylate content in the formulation of Example 7 the presently preferred polymer of the instant invention viscosity was stabilized at about 5,500 cp.

The adhesive of the invention was subjected to a number of quantitative and qualitative evaluations. When the paper was primed, the adhesive was coated on the primed side of the paper.

In a first test, when 80 parts of the adhesive of Example 2 was combined with 20 parts of Polymer A coated on to Simpson 104 a 50 lb. paper stock, bleed resistance was good. When 90 parts of the adhesive of Example 2 was blended with 10 parts Polymer A and coated on alkaline phosphored paper, the product had an initial shear of 2.7 minutes at a 500 gm. weight, a loop tack of 1.6 lbs./in. a 90° peel of 1.6 lbs./in. as initially coated and after exposure to 90% humidity at 40° C. for one week, a shear of 3.3 minutes, a loop tack of 1.2 lbs./in. and 90° peel of 1.6 lbs./in. When 90 parts of the adhesive of Example 4 was combined with 10 parts of Polymer A, shear was 8.6 minutes and when combined in proportions of 85 parts of the adhesive of Example 4 and 15 parts of Polymer A gave a shear of 9 minutes. Table V shows a paper evaluation for the adhesives of Example 1 on Polymer A in proportion shown for processed acid phosphored paper and alkaline phosphored paper.

Table VI compares the performance of an acid functional repulpable adhesive (Control 3) to composition of 80 parts of the polymer of Example 2 and 20 parts by weight of Polymer A (Example 8) to AT-1, a commercial acrylic emulsion pressure-sensitive adhesive made and sold by Avery Dennison Corporation when applied to a primed alkaline phosphored paper. As can be seen after the 40° C., 90% relative humidity test (RH). The adhesives of Control 3 and Control 4 all grab while the adhesive of Example 8 displayed good grab and favorably met the properties of repositionability and permanent bond to bond paper (B) and white-woven paper (WW). It is the requirement of the postal service that a pressure-sensitive adhesive be initially repositionable and achieve a degree of permanent adhesion within one hour. The adhesive must also be separable from the stamp based on the relative ratings of the repositionability and permanence, water removability and smear are also shown in Table 6 and used herein for other evaluations.

The adhesive of Example 2 when used alone on Simpson 104 paper displayed very good repulpability.

Table VII shows the performance of an adhesive formed of 80 parts of the adhesive of Example 4 and 20 parts of Polymer B applied to a primed acid phosphored paper at a coat weight of 24.2 g/m². "I" means initial performance and "RH" means performance after exposure to 90% relative humidity at 40° C. for one week. Table VIII shows the relative performance of the adhesive of Example 6 coated onto a primed acid phosphored paper at a coat weight of 22.4 g/m², Table IX shows a performance of the preferred adhesive of Example 7 again coated on a primed acid phosphored paper at a coat weight of 19.8 g/m².

TABLE IV

| | Examples and Controls | | | | | | | | |
|---|---|---|---|---|---|---|---|---|---|
| | Ex 1 | Ex 2 | Ex 3 | Ex 4 | Ex 5 | Ex 6 | Ex 7 | Cont 1 | Cont 2 |
| Monomer composition and Ratio 1st stage/2nd stage | 2 to 3 | 2 to 3 | 2 to 3 | 2 to 3 | 2 to 3 | 2 to 3 | 2 to 3 | 2 to 3 | 2 to 3 |
| 1st Stage | | | | | | | | | |
| 2-EHA | 60 | 60 | 60 | 55 | 55 | 55 | 55 | 60 | 60 |
| VAc | 12.5 | 12.5 | 12.5 | 15 | 0 | 15 | 30 | 12.5 | 12.5 |
| MA | 12.5 | 12.5 | 12.5 | 15 | 30 | 15 | 0 | 12.5 | 12.5 |
| HEMA | 15 | 15 | 15 | 15 | 15 | 15 | 15 | 15 | 0 |
| VP | 0 | 0 | 0 | 0 | 0 | 0 | 0 | 0 | 15 |
| n-DDM | 0 | 0 | 0 | 0 | 0 | 0 | 0 | 0 | 0 |
| 2nd Stage | | | | | | | | | |
| 2-EHA | 60 | 60 | 60 | 55 | 55 | 55 | 55 | 60 | 60 |
| VAc | 12.5 | 12.5 | 12.5 | 0 | 0 | 15 | 20 | 12.5 | 12.5 |
| MA | 12.5 | 12.5 | 12.5 | 30 | 30 | 15 | 10 | 12.5 | 12.5 |
| HEMA | 15 | 15 | 15 | 15 | 15 | 15 | 15 | 15 | 0 |
| VP | 0 | 0 | 0 | 0 | 0 | 0 | 0 | 0 | 15 |
| n-DDM | 0.83 | 0.5 | 0.25 | 0.5 | 0.5 | 0.5 | 0.58 | 0 | 0.5 |
| Cold Water Wash-off | pass | pass | | good | poor | marg. | good | fail | fail |
| Hot (70° C.) Water Wash-off | | | | good | marg. | good | good | fail | fail |
| 90% RH, 40° C. | light | better | | light | | | | | good |

TABLE IV-continued

| | Ex 1 | Ex 2 | Ex 3 | Ex 4 | Ex 5 | Ex 6 | Ex 7 | Cont 1 | Cont 2 |
|---|---|---|---|---|---|---|---|---|---|
| | shading | than A | | shading | | | | | | marg. = marginal

TABLE V

| Paper | Polymer blend | Ratio | Repulpability | 1 week aging at 40° C. and > 90% RH |
|---|---|---|---|---|
| Consolidated Acid processed, yellowish pre-phosphorized | Ex 2/Polymer | 80/20 80/20 | Poor at 40° C. Fair at 70° C. | Good grab |
| Westvaco Alkaline processed, white pre-phosphorized | Ex 1 Polymer | 60/40 | Poor | Good Grab |

TABLE VI

| | | Control 3 | | Ex 8 | Control 4 |
|---|---|---|---|---|---|
| Physical Tests | | | | | |
| 500 g SHear, min | | 55.1 | | 8.8 | 32.6 |
| 180 Peel, lb/in | | IPT | | IPT | IPT |
| 90 Peel, lb/in | | IPT | | IPT | IPT |
| Loop tack, lb/in | | 2.55 | | 2.30 | 1.75 |
| Repo and Perm | | | | | |
| 30 sec | | B | | A | B A |
| | | WW | A | A/B + G | B |
| 60 sec | | B | A | B/C | A/B |
| | | WW | A | B + G | B/B + E |
| 90 sec | | B | A | B | A/B |
| | | WW | A | B + G | A/B |
| 1 hr | | B | C/D | D/D + F | F/D |
| | | WW | C | D | F |
| Water Removability | | B | 2 | 2 | 2 |
| | | WW | 2 | 2 | 2 |
| Smear | | | ++ | + | 0 |
| 90% rel humidity test | | | no grab | good grab | no grab |

| Repositionability and Permanence | Water Removability | Smear |
|---|---|---|
| A = cleanly removable | 1 = adh dissolves | ++ = much better |
| B = slight envelope pick | 2 = adh on envelope | + = better |
| C = great envelope pick | 3 = adh on stamp | 0 = comparison of AT-1 |
| D = envelope tear | 4 = fibers + adh on stamp | − = worse |
| E = face pick | 5 = stamp damaged | −− = much worse |
| F = face tear | * = rubs off easily | IPT = immediate paper tear |
| G = spot adh transfer | ** = rubs off with effort | PT = paper tear |

TABLE VII

Adhesive Performance

| | | Initial | RH |
|---|---|---|---|
| Shear 500 g | Min | 4.0 | 13.6 |
| 180° peel | lb/min | 0.55 IPT | 2.06 PT |
| 90° peel | lb/in | 0.55 | 1.36 |
| loop tack | lb/in | 1.51 | 1.98 |

Bond (B) Repositionability I/RH

| Run | 30 sec | 60 sec | 90 sec | 1 hr |
|---|---|---|---|---|
| 1 | A/A | A/B | A/B | F/D |
| 2 | A/A | A/A | A/A | F/D |
| 3 | A/A | A/B | A/B | F/F + D |
| 4 | A/A | A/A | A/B | F/F + D |
| 5 | A/A | A/B | A/B | F/D |

White Woven (I/RH)

| | | | | |
|---|---|---|---|---|
| 1 | A/A | G/B | G + B/B | F + D/D |
| 2 | A/A | B/B | G/B | F + D/D |
| 3 | A/B | B/C | G/C | F + D/D |
| 4 | A/A | A/B | G/B | F + D/F + D |
| 5 | A/A | A/A | G/A | F + D/F + D |

Smear: + (no smear done for RH)

Water removability:
|  | I | B | WW |
|---|---|---|---|
|  | | 2 | 2 |
| RH | | 2 | 2 |

PT = Paper Tear

TABLE VIII

Adhesive Properties

| | | Initial | RH |
|---|---|---|---|
| Shear 500 g | Min | 35.3 | 31.1 |
| 90° peel | lb/in | IPT | IPT |
| 180° peel | lb/in | IPT | IPT |
| loop tack | lb/in | IPT | IPT |

Removability and Repositionability I/RH Bond

| Run | 30 sec | 60 sec | 90 sec | 1 hr |
|---|---|---|---|---|
| 1 | B/B | B/B | B/B | D/F + D |
| 2 | B/B | A/C | B/B | D/F + D |
| 3 | C/B | −/A | −/A | −/D |
| 4 | B/B | C/B | B/B | −B + D |
| 5 | B/A | B/A | B/B | D/D |

White Woven

| | | | | |
|---|---|---|---|---|
| 1 | C/F | −/− | −/− | −/− |
| 2 | D/B | −/B | −/B | −/D + F |
| 3 | B/B | C/B | C/B | D + F/D |
| 4 | B/B | B/B | B/B | D + F/D |
| 5 | C/A | −/A | −/A | −/D + F |

− = No test

TABLE IX

Adhesive Properties

| | | Initial | RH |
|---|---|---|---|
| Shear 500 g | Min | 11.8 | 18.8 |
| 90° peel | lb/in | IPT | IPT |
| Loop tack | lb/in | 2.23 PT | 1.50 PT |

Water Removability

| | Initial | RH |
|---|---|---|
| Bond | 2 | 2 |
| White Woven | 2 | 2 |

What is claimed is:

1. A water-dispersible, inherently tacky pressure-sensitive adhesive comprising a tacky emulsion polymer formed from about 55% to 90% by weight of a first monomer which is at least one alkyl acrylate containing from 4 to about 8 carbon atoms in the alkyl group, from about 10% to about 20% by weight of hydroxyethyl methacrylate from 0% to about 30% by weight of at least one vinyl ester, and from 0% to about 30% by weight methyl acrylate, said emulsion polymer having a glass transition temperature of about −15° to about −50° C., formed in the presence of anionic and nonionic surfactants, and in the presence of a sufficient amount of chain transfer agent to provide a repulpable pressure-sensitive adhesive which when applied to paper will pass Tappi UM 204.

2. A pressure-sensitive adhesive as claimed in claim 1 in which the hydroxyethyl methacrylate is present in an amount of about 15% to about 19% by weight of the polymer.

3. A pressure-sensitive adhesive as claimed in claim 1 in which the alkyl acrylate is selected from the group consisting of 2-ethylhexyl acrylate, isooctyl acrylate and mixtures thereof present in an amount of from about 55 to about 60% by weight of the polymer.

4. A pressure-sensitive adhesive as claimed in claim 2 in which the alkyl acrylate is selected from the group consisting of 2-ethylhexyl acrylate, isooctyl acrylate and mixtures thereof present in an amount of from about 55 to about 60% by weight of the polymer.

5. A pressure-sensitive adhesive as claimed in claim 1 in which the nonionic surfactant is an ethoxylated rosin acid.

6. A pressure-sensitive adhesive as claimed in claim 1 in which the anionic surfactant is a sulfated ethoxylated nonyl phenol.

7. A pressure-sensitive adhesive as claimed in claim 5 in which the anionic surfactant is a sulfated ethoxylated nonyl phenol.

8. A pressure-sensitive adhesive as claimed in claim 1 in which the polymer is formed by sequential polymerization by addition to a preemulsion containing the nonionic surfactant of a first monomer preemulsion containing about 40% of the total monomers and followed by addition of a second monomer preemulsion containing the balance of the monomer and an anionic surfactant.

9. A pressure-sensitive adhesive as claimed in claim 8 in which the anionic surfactant is a sulfated ethoxylated nonylphenol.

10. A pressure-sensitive adhesive as claimed in claim 9 in which the anionic surfactant is a sulfated ethoxylated nonyl phenol.

11. A water-dispersible inherently tacky pressure-sensitive adhesive as claimed in claim 1 in which the chain transfer agent is n-dodecyl mercaptan.

12. A water-dispersible inherently tacky pressure-sensitive adhesive as claimed in claim 8 in which the chain transfer agent is n-dodecyl mercaptan.

13. A water-dispersible inherently tacky pressure-sensitive adhesive as claimed in claim 10 in which the chain transfer agent is n-dodecyl mercaptan.

14. A water-dispersible, inherently tacky pressure-sensitive adhesive comprising tacky emulsion polymers formed from about 55% to 60% by weight of a 2-ethylhexyl acrylate and from about 20% to 10% by weight of hydroxyethyl methacrylate, 0 to 30% by weight vinyl acetate and from 0 to 30% by weight methyl acrylate said emulsion polymer formed by sequential polymerization in the presence of a sulfonated ethoxylated nonyl phenol anionic surfactant and an ethoxylated rosin acid nonionic surfactant to provide a polymer having a glass transition temperature of about −15° to about −50° C., and formed in the presence of from about 0.5% about 1.5% by weight of the monomers of n-dodecyl mercaptan to provide an emulsion polymer which when coated on an alkaline phosphored paper substrate being sufficiently dispersible to pass Tappi UM 204 to enable recovery of paper fibers substantially free of adhesive, said adhesive being resistant to loss of adhesive properties on exposure to 90% relative humidity at 40° C.

15. A pressure-sensitive adhesive as claimed in claim 14 in which the pressure-sensitive adhesive is prepared by sequential polymerization of about 40% of the monomers and the anionic surfactant added to an initial aqueous charge containing the nonionic surfactant followed by addition of a preemulsion of about 60% of the monomers in an aqueous solution comprising a nonionic surfactant.

16. A pressure-sensitive adhesive as claimed in claim 1 in which the mixture further contains a tackifier.

17. A pressure-sensitive adhesive as claimed in claim 16 in which the tackifier is selected from the group consisting of a rosin esters and rosin acids.

18. A pressure-sensitive adhesive as claimed in claim 14 in which the mixture further contains a tackifier.

19. A pressure-sensitive adhesive as claimed in claim 14 in which the tackifier is selected from the group consisting of rosin esters and rosin acids.

20. The pressure-sensitive adhesive as claimed in claim 1 supported by one side of a paper backing which is alkaline prephosphorized paper.

21. The pressure-sensitive adhesive as claimed in claim 20 in which the adhesive is also in contact with a release surface.

22. The pressure-sensitive adhesive as claimed in claim 20 in which the release surface is provided by a release liner.

23. The pressure-sensitive adhesive as claimed in claim 21 in which the release surface is on a side of the paper backing opposed to the side supporting the pressure-sensitive adhesive.

24. The pressure-sensitive adhesive as claimed in claim 20 in which a water soluble layer is contained between the pressure-sensitive adhesive and paper backing said water soluble layer enabling intact removal of the paper backing from the pressure-sensitive adhesive within about 30 minutes after immersion in water.

25. The pressure-sensitive adhesive as claimed in claim 24 in which the adhesive is also in contact with a release surface.

26. The pressure-sensitive adhesive as claimed in claim 24 in which the release surface is provided by a release liner.

27. The pressure-sensitive adhesive as claimed in claim 24 in which the release surface is on a side of the paper backing opposed to the side supporting the pressure-sensitive adhesive.

28. A water-dispersible, inherently tacky pressure-sensitive adhesive comprising a tacky emulsion polymer formed from about 55% to 90% by weight of a first monomer which is at least one alkyl acrylate containing from 4 to about 8 carbon atoms in the alkyl group, from about 10% to about 20% by weight of hydroxyethyl methacrylate from 0% to about 30% by weight of at least one vinyl ester, and from 0% to about 30% by weight methyl acrylate, said emulsion polymer said polymer having a glass transition temperature of about −15° to about −50° C., formed in the presence of anionic and nonionic surfactants, and in the presence of a sufficient amount of chain transfer agent to provide an emulsion polymer which, when coated onto a repulpable paper substrate, is sufficiently dispersible to pass Tappi UM 204, said adhesive being resistant to loss of adhesive properties and bleed on exposure to 90% relative humidity at 40° C.

29. A water-dispersible, inherently tacky pressure-sensitive adhesive comprising tacky emulsion polymers formed from about 55% by weight of 2-ethylhexyl acrylate and from about 15% by weight of hydroxyethyl methacrylate, 25% by weight vinyl acetate and about 5% by weight methyl acrylate said emulsion polymer formed by sequential polymerization in the presence of a sulfonated ethoxylated nonyl phenol anionic surfactant and an ethoxylated rosin acid nonionic surfactant to provide a polymer having a glass transition temperature of about −15° to about −50° C., and formed in the presence of from about 0.5% about 1.5% by weight of the monomers of n-dodecyl mercaptan to provide an emulsion polymer which when applied to repulpable paper is sufficiently dispersible to pass Tappi UM 204.

* * * * *

UNITED STATES PATENT AND TRADEMARK OFFICE
CERTIFICATE OF CORRECTION

PATENT NO. : 5,326,644
DATED : July 5, 1994
INVENTOR(S) : William F. Scholz; Robert H. Van Ham It is certified that error appears in the above-indentified patent and that said Letters Patent is hereby corrected as shown below:

```
Column 2, line 11, after "polymerization" delete "from".
Column 2, line 49, after "90%" change "b" to -- by --.
Column 2, line 62, change "composition" to
          -- compositions --.
Column 3, line 39, change "r-dodecyl" to
          -- n-dodecyl --.
Column 4, line 40, change "i.e:" to -- is --.
Column 5, line 61, change "through" to -- thorough --.
Column 8, line 18, change "(RH). The" to
          -- (RH), the --.
Column 9, lines 24,25, change "180" and "90" to
          -- 180° -- and -- 90° --, respectively.
Column 9, line 56, change "lb/min" to -- lb/in --.
```

UNITED STATES PATENT AND TRADEMARK OFFICE
CERTIFICATE OF CORRECTION

PATENT NO. : 5,326,644

DATED : July 5, 1994

INVENTOR(S) : William F. Scholz; Robert H. Van Ham

It is certified that error appears in the above-indentified patent and that said Letters Patent is hereby corrected as shown below:

Column 11, line 67, before "about" (2nd occurrence) insert --to--
Column 12, line 19, before "rosin" delete "a".
Column 14, line 6, before "about" insert -- to --.

Signed and Sealed this

Twenty-first Day of March, 1995

Attest:

BRUCE LEHMAN

Attesting Officer

Commissioner of Patents and Trademarks